United States Patent Office 3,743,706
Patented July 3, 1973

3,743,706
PROCESS FOR THE PRODUCTION OF ORGANIC HYDROGEN PEROXIDE SOLUTION
Gerhard Kabisch and Wolfgang Kunkel, Rheinfelden, Germany, assignors to Deutsche Gold- und Silber-Scheideanstalt vormals Roessler, Frankfurt am Main, Germany
No Drawing. Filed Aug. 9, 1971, Ser. No. 170,366
Claims priority, application Germany, Aug. 19, 1970,
P 20 41 124.9
Int. Cl. C01b *15/02, 15/00*
U.S. Cl. 423—588       9 Claims

ABSTRACT OF THE DISCLOSURE

Organic hydrogen peroxide solutions are obtained by extracting aqueous crude hydrogen peroxide solutions arising from the anthraquinone process using as the extraction agent carboxylic acid esters having a total of 4 to 10 carbon atoms.

---

The present invention is directed to a process for the production of hydrogen peroxide solutions in organic solvents. Such $H_2O_2$ solutions today have acquired a large industrial importance, for example for the production of water free (anhydrous) percarboxylic acid solutions.

Hydrogen peroxide is produced on a large scale to over 90% by the so called anthraquinone process and is accumulated in the extraction step of the cyclic process in the form of aqueous solutions having an $H_2O_2$ content of about 20–35 weight percent. Hydrogen peroxide concentrates, as the $H_2O_2$ commercial product with an $H_2O_2$ content of 65–70 weight percent for example still are obtained exclusively today by total distillation of the crude extract, products with $H_2O_2$ contents of over 80% are recovered practically only by two distillations.

The production of organic $H_2O_2$ solutions on the basis of these aqueous products can take place by extracting an about 30 weight percent solution with ether, adding an organic solvent and then separating the ether by distillation (see Houben-Weyl, Methoden der organischen Chemie, Sauerstoffverbindangen III, vol. 8, page 33). These known methods because of their troublesomeness and dangerousness until now have been limited to use in laboratory techniques.

It is also known (for example see British Pat. 931,119) to dissolve highly concentrated, preferably over 80 weight percent, aqueous $H_2O_2$ solutions in organic solvents. If water free $H_2O_2$ solutions are desired the water can be subsequently removed by azeotropic distillation. This process, however, until now has not been accepted in the art since the necessary, highly concentrated $H_2O_2$ is an expensive material due to high energy costs.

A process has recently become known through German patent application 1,802,003 and the corresponding Schreyer et al. U.S. application 856,070 filed Sept. 8, 1969 and now abandoned and the continuation-in-part Schreyer et al. application 79,315 filed Oct. 8, 1970 in which non aqueous $H_2O_2$ solutions are produced by separating the $H_2O_2$ present in the working solution of the anthraquinone process with the aid of easily volatile organic solvents. Also in this industrially more attractive process it is a matter of a total distillation of the $H_2O_2$-solvent mixture.

It has now been found that there can be obtained solutions of $H_2O_2$ in organic solvents under industrially simple and economically favorable conditions if the aqueous crude extract formed in the anthraquinone process is washed with a carboxylic acid ester having a total of 4 to 10 carbon atoms. Preferably there are used such extracts which contain over 35 weight percent $H_2O_2$, e.g. up to 55%, especially preferred are aqueous extracts containing 45 to 55 weight percent $H_2O_2$. The preferred esters are acetates, most preferably n-propyl acetate.

In the anthraquinone process there are used alkyl anthraquinones such as, 2-ethyl anthraquinone, 2-butyl anthraquinone, 2-isopropyl anthraquinone, 2-amyl anthraquinone, 2-sec. butyl anthraquinone, 2-t-butyl anthraquinone, 2-sec. amyl anthraquinone, and mixtures of them as well as their partially nuclear hydrogenated derivatives, e.g. the tetrahydro anthraquinones such as 2-ethyl tetrahydro anthraquinone.

The esters employed are alkyl alkanoates such as ethyl acetate, propyl acetate, butyl acetate, isopropyl acetate, propyl formate, butyl formate, isobutyl acetate, t-butyl acetate, amyl acetate, isoamyl acetate, octyl acetate, heptyl acetate, hexyl acetate, cyclohexyl formate, cyclopentyl acetate, cyclohexyl acetate, methyl propionate, ethyl propionate, propyl propionate, methyl butyrate, ethyl butyrate, methyl valerate, methyl isovalerate, 2-ethylbutyl acetate, sec-hexyl acetate, isopropyl propionate, amyl propionate, propyl butyrate, isobutyl butyrate, methyl isobutyrate, ethyl isobutyrates, propyl isobutyrate, isopropyl isobutyrate, amyl isobutyrate, ethyl valerate, methyl isovalerate, propyl isovalerate, methyl caproate, methyl pivalate, ethyl pivalate, propyl pivalate, isopropyl pivalate, butyl pivalate, sec. butyl pivalate, amyl pivalate and methyl ester of 2,2-dimethyl valeric acid.

It could not be predicted that carboxylic acid esters having a total of 4 to 10 carbon atoms could be used for the extraction of $H_2O_2$ from aqueous solutions of up to 55% $H_2O_2$ content since British Pat. 931,119 teaches that esters are soluble in highly concentrated aqueous $H_2O_2$. Surprisingly, however, the esters used according to the invention are largely insolubule in the $H_2O_2$-crude extract of the anthraquinone process and in regard to the absorbing of $H_2O_2$ and water possess such a good selectivity that they make outstanding extraction media. Thus, for example (see Table I) the $H_2O_2:H_2O$ ratio of 50:50 in the aqueous starting solution can be increased to a ratio of over 78:22 in the organic phase. While one the one hand esters with less than 4 carbon atoms, as for example, methyl acetate, are soluble in the aqueous crude extract and therefore cannot be used in the process of the present invention, on the other hand carboxylic acid esters with more than 10 carbon atoms possess so small an $H_2O_2$ absorptive power that their use is uneconomical. Esters with a total number of carbon atoms in the range of 4–10, however, fulfill surprisingly well the conditions of sufficient insolubility and a high absorptive power for $H_2O_2$ in the extraction of $H_2O_2$ from an aqueous crude extract up to 55%.

The extraction media of the invention moreover, are good entraining agents for water since they form favorable azeotropes with it so that water free solutions are obtained in a simple manner, if an entraining distillation is carried out for the removal of the residual water after the extraction.

In contrast to the known processes, especially that of British Pat. 931,119 the process of the invention has the decided advantage that the concentration of $H_2O_2$ is carried out by simple extraction instead of expensive distillation latter being also accompanied by $H_2O_2$-losses.

The process with the extraction agents of the invention can be carried out in a practical manner simply and safely either batchwise or continuously in the usual extraction apparatuses (columns, extraction machines, mixer settlers).

The extraction temperature can be between 0 and 60° C., preferably, however, the temperature is between 10 and 40° C.

Unless otherwise indicated all parts and percentages are by weight.

EXAMPLE 1

The binodal curves for the system $H_2O$-$H_2O_2$-carboxylic acid ester were determined by turbidity titration at 20° C. The concentration of $H_2O_2$ in several esters in equilibrium with 50% aqueous hydrogen peroxide and the concentration of the water taken up are shown in Table I.

TABLE I

| Ester | Weight percent of— | | Proportion $H_2O_2/H_2O$ in ester |
|---|---|---|---|
| | $H_2O_2$ in ester | $H_2O$ in ester | |
| n-Propyl acetate | 13.1 | 5.0 | 72.4:27.6 |
| Isopropyl acetate | 12.5 | 4.5 | 73.6:24.4 |
| n-Butyl acetate | 7.2 | 2.0 | 78.3:21.7 |
| Methyl propionate | 22.0 | 10.0 | 68.8:31.2 |

EXAMPLE 2

In an extraction machine whose efficiency corresponded to 5 theoretical steps there was extracted 50% aqueous $H_2O_2$ with propyl acetate. After the extraction equilibrium was reached at room temperature the solutions flowing off were analyzed. The aqueous phase still contained 17.0% $H_2O_2$, the organic phase contained 8.8 weight percent $H_2O_2$.

EXAMPLE 3

2.19 kg. of 50% aqueous $H_2O_2$ was extracted hourly in an extraction column with 9.682 kg. of n-propyl acetate at room temperature.

From the head of the column there was drawn off a solution which contained 9% (1.0 kg.) $H_2O_2$, 4% (0.44 kg.) of $H_2O$ and 87% (9.67 kg.) of n-propyl acetate.

The raffinate leaving the bottom of the column contained 12.5% (0.09 kg.) $H_2O_2$, 2% (0.015 kg.) propyl acetate and 85.5% (0.65 kg.) of water.

The amount of $H_2O_2$ taken up in the organic phase corresponded to 93% of the amount fed in as aqueous $H_2O_2$.

EXAMPLE 4

The 50% $H_2O_2$ is produced according to Ser. No. 69152 (corresponding to Belgian Pat. 756014) in a technical apparatus there was recycled a working solution through the process steps hydrogenation, filtration, oxidation and extraction. The working solution had a composition analogous to that of German Pat. 1,261,838. The solvent consisted of 25 parts by volume trioctyl phosphate and 75 parts by volume of a technical alkylbenzene having a boiling range of 160 to 185° C. In the solution there were dissolved 125 grams/l. of 2-ethyl anthraquinone. The flow of the working solution amounted to 500 liters per hour. The $H_2O_2$ content in the working solution after the oxidation step using 10% excess air as the oxidizing gas amounted to 1.0 weight percent on the average. The extraction steps consisted of two spray columns, each 100 millimeter in diameter and 9 meters long. Each of the columns had on their bottom as a distributor a perforated plate with a free cross section of 4.2%. In the extraction column there were fed hourly 4.75 liters of water. There arose $H_2O_2$ in an amount of 7.8 liters (density 1.194 at 15° C.) whose concentration on the average amounted to 50 weight percent. The amount of $H_2O_2$ obtained corresponded to an extraction yield of 98%. The temperature in the hydrogenation step was 43° C. and the catalyst was palladium.

The 50% $H_2O_2$ had a carbon content of 187 mg. C./liter. After passage through a 4 meter long washing column (50 mm. in diameter). (filled with aromatic hydrocarbon, boiling range 160–185° C.), the carbon value in the 50% $H_2O_2$ was lowered to 162 mg. C./l.

What is claimed is:

1. A process for the production of a solution of hydrogen peroxide in an organic solvent by extraction of aqueous crude hydrogen peroxide solution formed in the anthraquinone process and containing 35 to 55 weight percent $H_2O_2$ comprising extracting said aqueous hydrogen peroxide solution with a carboxylic acid ester having a total of 4 to 10 carbon atoms at a temperature of 0 to 60° C.

2. The process according to claim 1 wherein the ester is an alkyl alkanoate.

3. The process according to claim 2 wherein the concentration of $H_2O_2$ in the starting solution is 45–55 weight percent.

4. The process according to claim 3 wherein the extraction is carried out at 10 to 40° C.

5. The process according to claim 2 wherein the extraction is carried out at 10 to 40° C.

6. The process according to claim 2 wherein the ester is an alkyl acetate or alkyl propionate.

7. The process according to claim 6 wherein the ester has 4 to 6 carbon atoms.

8. The process according to claim 7 wherein the ester is an acetate.

9. The process according to claim 8 wherein the ester is n-propyl acetate.

References Cited

UNITED STATES PATENTS 3,592,776   7/1972   Fletcher et al.   23—207

FOREIGN PATENTS 931,119   7/1963   Great Britain   252—186

OSCAR R. VERTIZ, Primary Examiner

H. S. MILLER, Assistant Examiner

U.S. Cl. X.R.

252—186